(12) United States Patent
Geary et al.

(10) Patent No.: US 8,226,141 B2
(45) Date of Patent: Jul. 24, 2012

(54) DEVICE FOR LOCKING JAWS OF A GRIPPER

(75) Inventors: James Geary, Pawcatuck, CT (US); Vipin Patel, Rochester Hills, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 13/046,847

(22) Filed: Mar. 14, 2011

(65) Prior Publication Data
US 2011/0241365 A1 Oct. 6, 2011

Related U.S. Application Data

(60) Provisional application No. 61/318,940, filed on Mar. 30, 2010.

(51) Int. Cl.
*B25J 15/00* (2006.01)
(52) U.S. Cl. ..................................... 294/119.1; 294/207
(58) Field of Classification Search .................. 294/207, 294/103.1, 119.1, 902, 86.4; 269/32, 34, 269/233, 234; 279/110, 121; 901/37, 39, 901/46
See application file for complete search history.

(56) References Cited

U.S. PATENT DOCUMENTS

| | | | | |
|---|---|---|---|---|
| 4,591,199 A | * | 5/1986 | Zajac | 294/203 |
| 4,653,793 A | * | 3/1987 | Guinot et al. | 294/119.1 |
| 4,715,636 A | | 12/1987 | Wiesner et al. | |
| 5,031,887 A | | 7/1991 | Johanson | |
| 5,330,167 A | | 7/1994 | Plumb | |
| 5,772,259 A | * | 6/1998 | Geary et al. | 285/145.1 |
| 5,829,811 A | | 11/1998 | Skinner, II | |
| 6,826,826 B2 | * | 12/2004 | Geary | 29/757 |
| 6,896,448 B1 | | 5/2005 | White | |
| 7,490,881 B2 | | 2/2009 | Null et al. | |

OTHER PUBLICATIONS

TRD Manufacturing, Inc., RL Series Rod Lock Cylinder, Bulletin RL-07, 7 pages.

* cited by examiner

*Primary Examiner* — Paul T Chin
(74) *Attorney, Agent, or Firm* — Harness, Dickey & Pierce, P.L.C.

(57) ABSTRACT

A gripper has a frame with a plurality of guide rods secured to the frame. At least one jaw is slidably secured with the plurality of guide rods. The at least one jaw includes a housing surrounding a portion of at least one of the guide rods. A locking device is positioned in the jaw housing. The locking device is adjacent the at least one guide rod. The locking device removably applies a force onto the at least one guide rod. The locking device locks the jaw in position when the force is applied and enables the jaw to slide on the guide rods when the force is removed.

15 Claims, 4 Drawing Sheets

DEVICE FOR LOCKING JAWS OF A GRIPPER

CROSS-REFERENCE TO RELATED APPLICATIONS

This application claims the benefit of U.S. Provisional Application No. 61/318,940, filed on Mar. 30, 2010. The entire disclosure of the above application is incorporated herein by reference.

FIELD

The present disclosure relates to a gripper and, more particularly, to a device for locking the jaws of the gripper to a guide rod.

BACKGROUND

In long stroke grippers, a so called rod lock device utilizes friction to hold a gripper's jaws in place in case power is lost to the gripper to avoid dropping the part. The device is air piloted to remain open during motion of the gripper jaws but will lock by an internal spring when air pressure is removed. This enables a gripper to be plumbed in such a way as to maintain jaw position in case of pressure loss. These devices mount outside of and onto the body of the gripper. They lock onto a separate shaft that is attached to the gripper jaws, like sidecars.

Several disadvantages of this type of system exist. The shaft and lock are usually side mounted and take up a significant amount of space around the gripper. The rod lock is expensive and requires additional bracketing, housing and shafts to accomplish locking. The lock shaft and lock mechanism are subjected to contamination that can reduce the holding force or cause the lock to fail. The shaft and lock mechanism design uses more parts and thus inherently adds more weight. This reduces the pay load on the gripper, making the gripper less favorable for application in the robotic and aerospace industries. The rod lock may be utilized on one or both grippers.

The present design overcomes the deficiencies of the prior art. The present disclosures provides a locking device that is integrally mounted into the jaws to enable locking of jaw motion if fluid pressure is lost. Additionally, the locking device may provide additional holding force. The present disclosure provides a locking device that is compact and is protected from contamination by being positioned inside the jaw and locking onto the provided guide shafts. The locking device is positioned within the sealed jaws rather than externally to the jaw and thus it is not exposed to contaminants. The lock may be applied into one or both of the jaws. Additionally, the lock may be utilized to provide additional locking force for high pressure grip applications.

SUMMARY

An aspect of the disclosure is a gripper with a device for locking the jaws comprising a frame with a plurality of guide rods secured to the frame. At least one jaw is slidable on the plurality of guide rods. The jaw includes a housing surrounding a portion of at least one of the guide rods. A locking member is positioned in the jaw housing. The locking member is adjacent to the at least one guide rod to removably apply a force onto the at least one guide rod to lock the jaw in position along the at least one guide rod when the force is applied. Additionally, the jaw slides along the guide rod when the force is removed from the locking device.

The gripper includes a pair of jaws slidable on the guide rods with a locking member in each of the jaw housings. The locking member surrounds at least one of the guide rods. A plurality of seals seal the locking member in the jaw housing. The locking member is positioned perpendicular to at least one guide rod.

In another aspect of the present disclosure, a gripper with a jaw locking device comprises a frame and at least one guide rod secured to the frame. At least one jaw is slidable on the at least one guide rod. The jaw includes a body surrounding a portion of the at least one guide rod. A locking member is integrally formed with the jaw body. The locking member applies a force onto the at least one guide rod to lock the jaw in position along the at least one guide rod to lock the jaw in position along the at least one guide rod when the force is applied. The locking member enables the jaw to slide on the at least one guide rod when the force is removed.

The gripper includes a pair of jaws slidable on the guide rods with a locking member in each of the jaw housings. The locking member surrounds at least one of the guide rods. A plurality of seals seal the locking member in the jaw housing. The locking member is positioned perpendicular to at least one guide rod.

According to a third aspect of the disclosure, a gripper includes a jaw locking device comprises a frame having a pair of spaced end plates. A plurality of guide rods are positioned between and secured to the end plates. A pair of jaws are slidable on the plurality of guide rods. The pair of jaws each include a body surrounding a portion of the plurality of guide rods. A locking member is positioned in each of the jaw bodies. The locking members removably apply a force onto at least one of the guide rods to lock the jaws in position along at least one of the guide rods when the force is applied. Additionally, the locking members enable the jaws to slide on the guide rods when the force is removed.

A plurality of seals seal the locking member is in the jaw housing. The locking member is positioned perpendicular to at least one guide rod.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
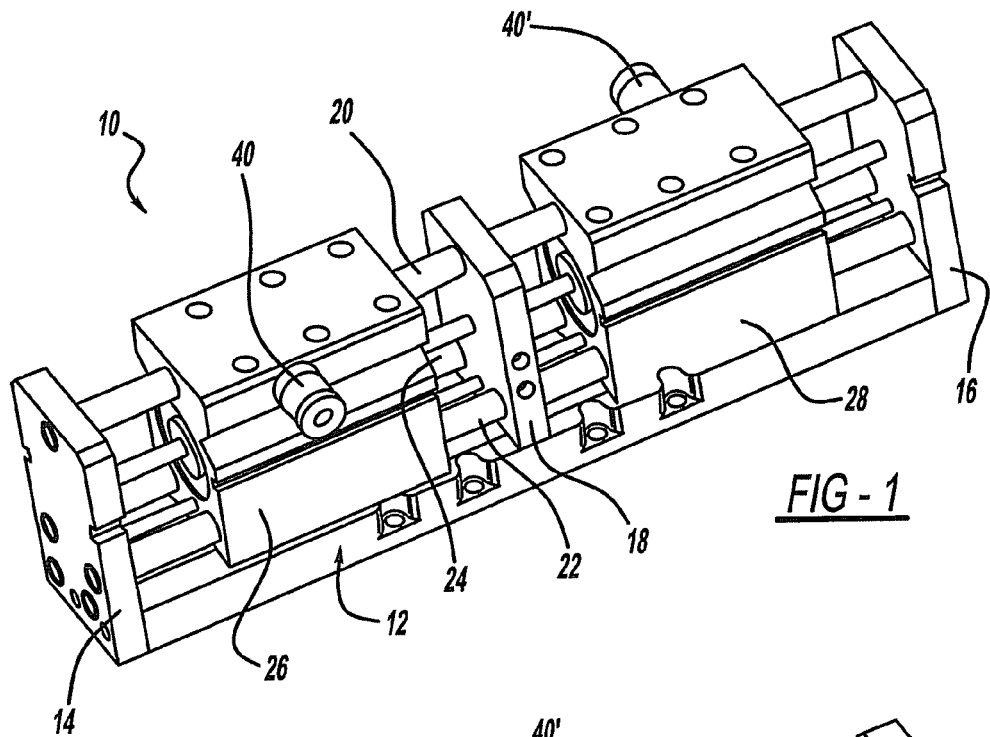
FIG. 1 is a perspective view of a gripper assembly including the locking device.
Figure 2:
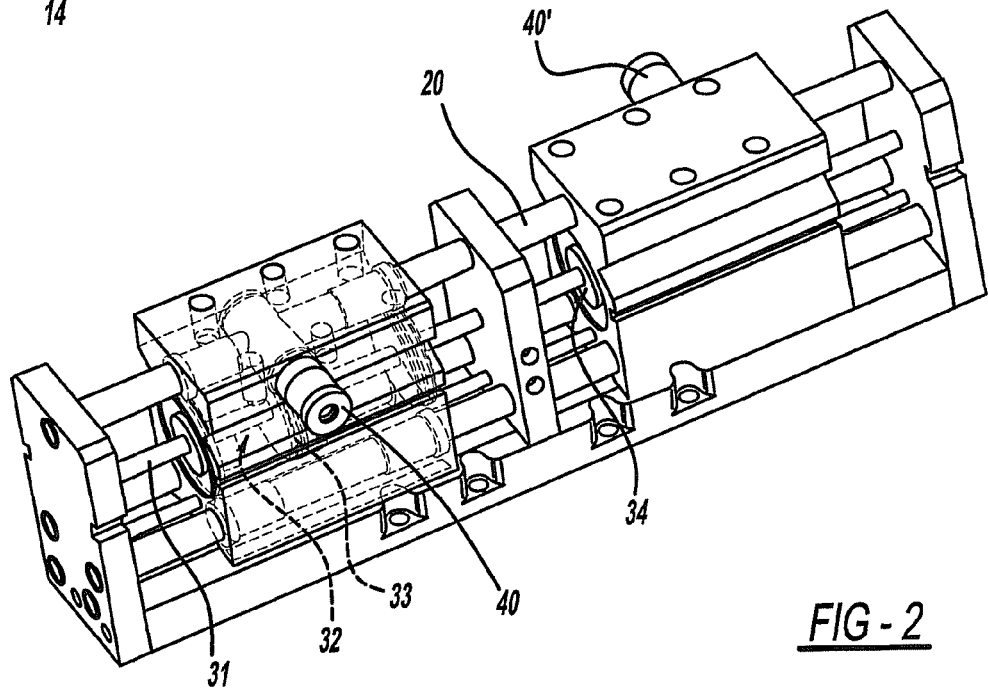
FIG. 2 is a perspective view of the jaw interior with the housing in phantom.

Turning to the figures, a gripper is illustrated and designated with the reference numeral 10. The gripper 10 includes a frame 12 having a pair of end plates 14, 16 with a mid plate 18. A plurality of guide rods, of which three are illustrated, 20, 22, 24, are positioned between the end plates 14, 16. A pair of jaw assemblies 26, 28 slidably move along the guide rods 20, 22, 24. Pistons 32, 34 move the jaws along the guide rods 20, 22, 24. A fluid passage (not shown) is formed in the end plates 14, 16 that enable fluid to pass through the piston shaft 31 into the piston assembly 33 inside of the jaw assemblies 26, 28, as seen in FIG. 2. A further explanation of the gripper may be found in U.S. Pat. No. 7,490,881 entitled "Long Travel Gripper, issued Feb. 17, 2009, the specification and drawings of which are herein expressly incorporated by reference.

The jaw assemblies 26, 28 include locking devices 40, 40'. The locking devices 40, 40' are identical and thus only one will be described in detail.

Figure 3:
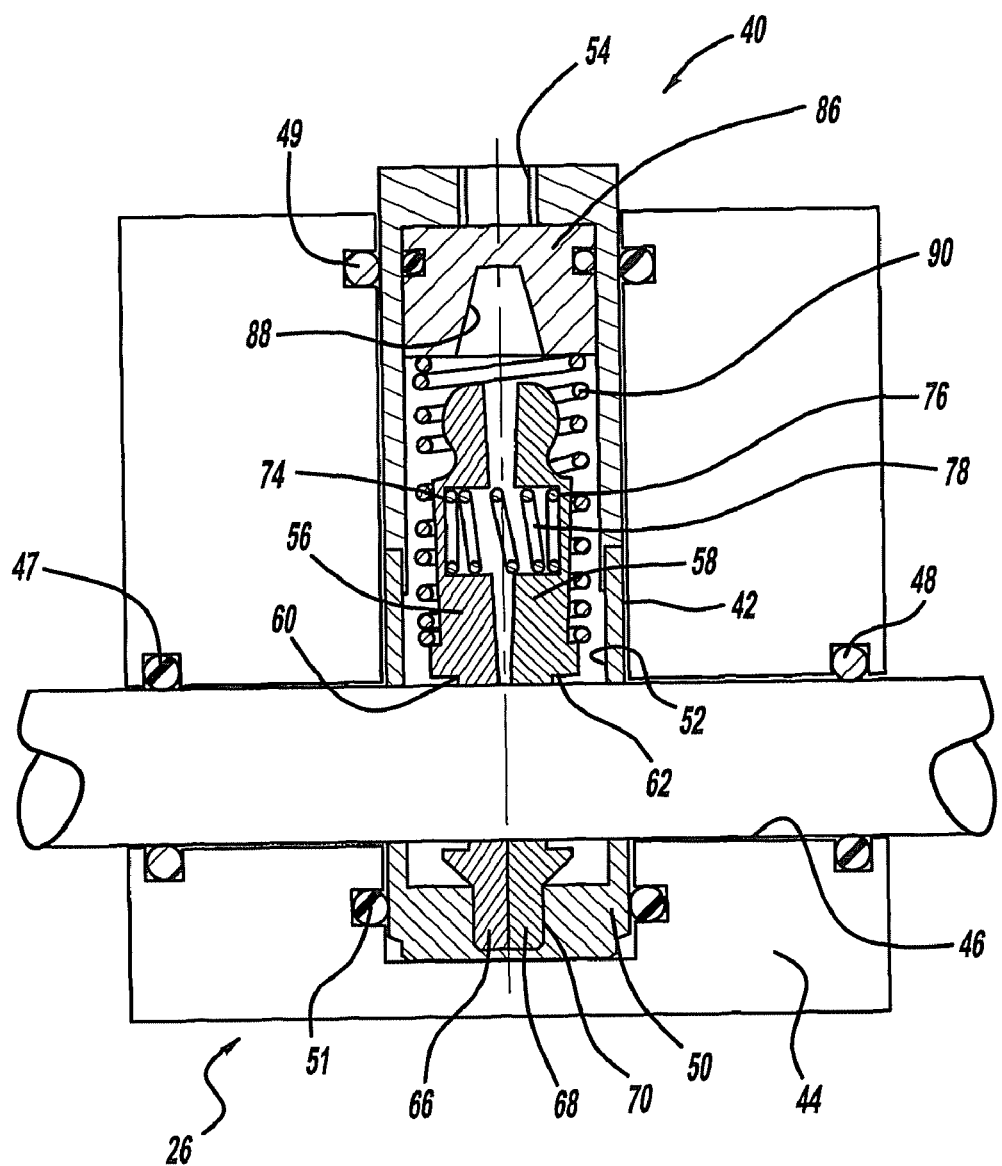
FIG. 3 is a cross-sectional view of FIG. 1 along lines 3-3 thereof.

Turning to FIG. 3, a cross-section of the jaw assembly 26 is illustrated. As seen, the jaw assembly 26 includes a body or housing 44 that surrounds the guide rail rod 20. The locking device 40 is positioned in a bore 42 in the jaw assembly housing 44. The bore 42 is transverse to the bore 46 that receives the guide rod 20. A pair of seals 47, 48 protects the jaw assembly housing 44 from the entry of containments. Additionally, a pair of seals 49, 51 surround the locking devices 40, 40' to prohibit the entry of containments.

The locking device 40 includes a body 50 having an overall cylindrical configuration. The body 50 includes a central bore 52 and an inlet port 54. The inlet port 54 receives a conduit (not shown) that supplies fluid into the locking device 40. The locking device 40 includes a pair of clamping plates 56, 58 that include apertures 60, 62. The apertures 60, 62 enable the guide rod 20 to pass through the clamping plates 56, 58. Additionally, the clamping plates 56, 58 include extending leg portions 66, 68 that are received in a bore 70 in the body 50. The leg portions 66, 68 act as pivots for the clamping plates 56, 58. The upper end of the clamping plates 56, 58 includes bores 74, 76 that receives a spring 78. Also, the clamping plates 56, 58 include a neck portion 80, 82.

The spring 78 is positioned in the bores 74, 76 of the clamping plates 56, 58 in an extended position pushing the clamping plates 56, 58 away from one another. Thus, wedging occurs between the walls defining the apertures 60, 62 and guide rod 20 to lock the jaw assembly 26 in position onto the guide rod 20.

Figure 4:
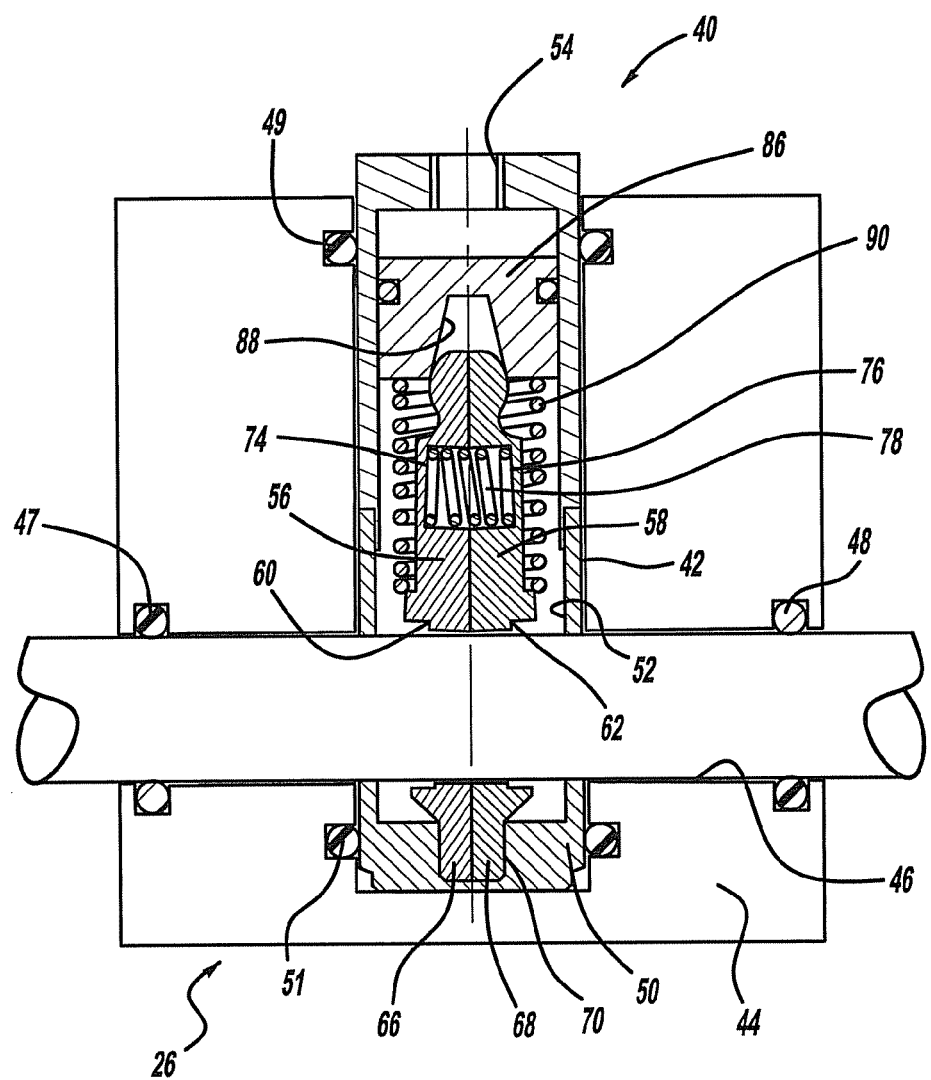
FIG. 4 is a cross-sectional view like FIG. 3 in a second position.

A piston 86 is positioned in the central bore 52 of the body 50. The piston 86 includes a cutout 88 that is in communication with the clamping plate necks 80, 82 to push the clamping plates 56, 58 toward one another as seen in FIG. 4. This releases the wedging effect and enables the jaw assemblies 26, 28 to slide on the guide rods 20, 22, 24. A spring 90 seats on the piston 86 and the clamping plates 56, 58. The spring 90 extends pushing the piston 86 out of engagement with the clamping plates neck portions 80, 82 when the fluid pressure is released from the piston 86 as seen in FIG. 3. Thus, the jaw assemblies 26, 28, when fluid is not applied to the locking mechanisms 40, 40', are in their locked condition.

In use, fluid pressure is applied onto the piston 86 via the bore 54. Thus, the piston 86 is forced inwardly toward the guide rod 20. As this occurs, the piston 86 compresses spring 90. The cutout 88, defining a truncated cone wall, contacts the clamping plate neck portions 80, 82. As this occurs, the clamping plates 56, 58 are drawn together against the resistance of the spring 78. This enables the jaw assemblies 26, 28 to slide on the guide rods 20, 22, 24. When the fluid pressure is removed or terminated or in the event that power is interrupted and the fluid pressure is terminated, the spring 90 extends and forces the piston 86 away from the clamping plates 56, 58. As this occurs, the spring 78 expands or extends, pushing the clamping plates 56, 58 away from one another creating a wedging force, via the aperture walls, onto the guide rod 20.

Accordingly, since the locking mechanism 40, 40' are positioned inside of the jaw housings, they are isolated from contamination. Also, by being integral with the jaw housings, this reduces the overall footprint of the jaw assemblies and reduces costs and complexity. The body 50 of the locking mechanisms 40, 40' is sealed within the jaw housing 44. The locking device 40, 40' is compact and lightweight, thus making it favorable for applications in both the robotic and aerospace industry.

Figure 5:
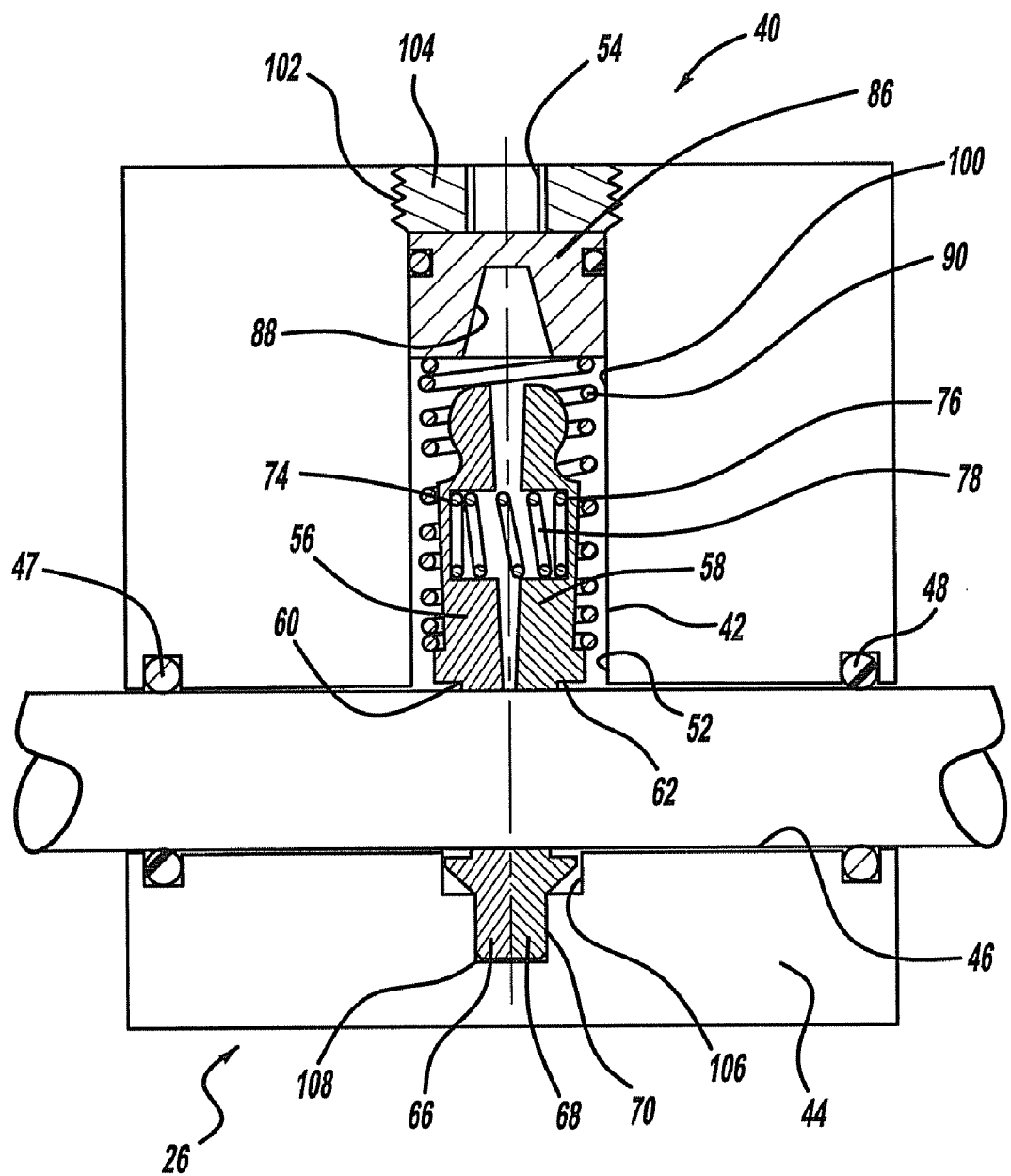
FIG. 5 is a view like FIG. 3 of a jaw with an integral locking device.

FIG. 5 is a view like FIG. 4. However, in FIG. 5, the locking mechanism 40 is integrally formed in the jaw 26 and does not include a body mechanism. Thus, elements that are the same include the same reference numeral.

In FIG. 5, the jaw includes a bore 100. The bore includes a threaded portion 102 near one end. Threaded portion 102 receives a threaded cover 104 which includes an inlet port 54 to be secured with an air conduit. The bore 100 includes a step down portion 106 and a terminating portion 108. The terminating portion 108 receives the leg portion 66 and 68 of the clamping plates 56 and 58. Thus, the locking mechanism functions like that previously defined.

The description of the disclosure is merely exemplary in nature and thus, variations that do not depart from the gist of the disclosure are intended to be within the scope of the disclosure. Such variations are not to be regarded as a departure from the spirit and scope of the disclosure.

What is claimed is:

1. A gripper with a device for locking the jaws of the gripper comprising:
   a frame;
   a plurality of guide rods secured on the frame;
   at least one jaw slidable on the plurality of guide rods, the jaw including a housing surrounding a portion of at least one of the guide rods;
   a locking member positioned in the jaw housing, the locking member adjacent the at least one guide rod for removably applying a force onto the at least one guide rod for locking the jaw in position along the at least one guide rod when the force is applied and enabling the jaw to slide on the guide rod when the force is removed.

2. The gripper of claim 1, wherein said gripper includes a pair of jaws slidable on the guide rods and a locking member in each jaw housing.

3. The gripper of claim 1, wherein the locking member surrounds the at least one guide rod.

4. The gripper of claim 1, further comprising a plurality of seals for sealing the locking member in the jaw housing.

5. The gripper of claim 1, wherein the locking member is positioned perpendicular to the at least one guide rod.

6. A gripper with a jaw locking device comprising:
   a frame;
   at least one guide rod secured to the frame;
   at least one jaw slidable on the at least one guide rod, the jaw including a body surrounding a portion of the at least one guide rod;
   a locking member integral with the jaw body, the locking member applying a force onto the at least one guide rod for locking the jaw in position along the at least one guide rod when the force is applied and enabling the jaw to slide on the at least one guide rod when the force is removed.

7. The gripper of claim 6, wherein said gripper includes a pair of jaws slidable on the guide rods and a locking member in each jaw housing.

8. The gripper of claim 6, wherein the locking member surrounds the at least one guide rod.

9. The gripper of claim 6, further comprising a plurality of seals for sealing the locking member in the jaw housing.

10. The gripper of claim 6, wherein the locking member is positioned perpendicular to the at least one guide rod.

11. A gripper with a jaw locking device comprising:
a frame having a pair of spaced end plates;
a plurality of guide rods positioned between and secured to the end plate;
a pair of jaws slidable on the plurality of guide rods, the pair of jaws each including a body surrounding a portion of the plurality of guide rods;
a locking member positioned in each of the jaw bodies, the locking members removably applying a force onto at least one of the guide rods for locking the jaws in position along the at least one guide rod when the force is applied and enabling the jaws to slide on the guide rods when the force is removed.

12. The gripper of claim 11, wherein said gripper includes a pair of jaws slidable on the guide rods and a locking member in each jaw housing.

13. The gripper of claim 11, wherein the locking member surrounds the at least one guide rod.

14. The gripper of claim 11, further comprising a plurality of seals for sealing the locking member in the jaw housing.

15. The gripper of claim 11, wherein the locking member is positioned perpendicular to the at least one guide rod.

* * * * *